(12) United States Patent
Weigand et al.

(10) Patent No.: US 10,172,006 B2
(45) Date of Patent: *Jan. 1, 2019

(54) METHODS AND SYSTEMS FOR PREVENTING A USER INPUT DEVICE FROM CONTROLLING USER EQUIPMENT

(71) Applicant: Rovi Guides, Inc., San Jose, CA (US)

(72) Inventors: Emily Weigand, Morgan Hill, CA (US); Milan Indu Patel, Santa Clara, CA (US); Nancy Huynh, San Jose, CA (US); Kevin S. Bright, Gilroy, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/895,726

(22) Filed: Feb. 13, 2018

(65) Prior Publication Data

US 2018/0227761 A1 Aug. 9, 2018

Related U.S. Application Data

(63) Continuation of application No. 15/248,476, filed on Aug. 26, 2016, now Pat. No. 9,936,389.

(51) Int. Cl.
| | |
|---|---|
| *H04M 1/66* | (2006.01) |
| *H04M 1/68* | (2006.01) |
| *H04M 3/16* | (2006.01) |
| *H04W 12/08* | (2009.01) |
| *H04M 1/725* | (2006.01) |
| *H04N 21/422* | (2011.01) |
| *H04N 21/436* | (2011.01) |

(Continued)

(52) U.S. Cl.
CPC ....... *H04W 12/08* (2013.01); *H04M 1/72527* (2013.01); *H04N 21/42204* (2013.01); *H04N 21/42207* (2013.01); *H04N 21/43615* (2013.01); *H04N 21/4532* (2013.01); *H04N 21/4751* (2013.01); *H04N 21/485* (2013.01)

(58) Field of Classification Search
CPC .............. H04W 12/08; H04M 1/72527; H04N 5/44543; H04N 21/4345
USPC .......................................... 455/411, 406, 407
See application file for complete search history.

(56) References Cited

U.S. PATENT DOCUMENTS

| | | |
|---|---|---|
| 6,239,794 B1 | 5/2001 | Yuen et al. |
| 6,564,378 B1 | 5/2003 | Satterfield et al. |

(Continued)

*Primary Examiner* — Marceau Milord
(74) *Attorney, Agent, or Firm* — Haley Guiliano LLP

(57) ABSTRACT

Methods and systems for preventing a user input device from controlling the user equipment are described herein. The method includes receiving, over a first communication path, by a user equipment, data indicative of a first request to restrict control by the user input device over the user equipment. The method includes disregarding a first command from the user input device response to receiving the first request. The method includes receiving, over the first communication path, data indicative of a second request to restore control by the user input device over the user equipment. The method includes receiving a second command from the user input device, the second command intended to alter a second setting of the user equipment, in response to receiving the second request. The method includes altering the second setting of the user equipment in response to receiving the second request and the second command.

20 Claims, 8 Drawing Sheets

(51) Int. Cl.
*H04N 21/45* (2011.01)
*H04N 21/475* (2011.01)
*H04N 21/485* (2011.01)

(56) References Cited

U.S. PATENT DOCUMENTS

| | | |
|---|---|---|
| 6,898,762 B2 | 5/2005 | Ellis et al. |
| 7,165,098 B1 | 1/2007 | Boyer et al. |
| 7,242,316 B2 | 7/2007 | Scheelke |
| 7,761,892 B2 | 7/2010 | Ellis et al. |
| 7,860,945 B2 | 12/2010 | Tsuji et al. |
| 7,962,930 B2 | 6/2011 | Kim |
| 7,996,399 B2 | 8/2011 | Billmaier et al. |
| 8,022,837 B2 | 9/2011 | Scheelke |
| 8,046,801 B2 | 10/2011 | Ellis et al. |
| 8,312,484 B1 | 11/2012 | McCarty et al. |
| 8,381,249 B2 | 2/2013 | Rasane et al. |
| 8,387,094 B1 | 2/2013 | Ho et al. |
| 8,843,953 B1 | 9/2014 | Dang et al. |
| 9,137,262 B2 | 9/2015 | Qureshi et al. |
| 9,338,487 B2 | 5/2016 | Perez |
| 9,667,903 B2 | 5/2017 | Schein et al. |
| 9,681,170 B2 | 6/2017 | Kunii et al. |
| 9,936,389 B2 * | 4/2018 | Weigand ........... H04M 1/72527 |
| 2002/0174430 A1 | 11/2002 | Ellis et al. |
| 2003/0058269 A1 | 3/2003 | Dunstan |
| 2004/0070593 A1 | 4/2004 | Neely et al. |
| 2005/0251827 A1 | 11/2005 | Ellis et al. |
| 2007/0011702 A1 | 1/2007 | Vaysman |
| 2008/0086456 A1 * | 4/2008 | Rasanen ............ H04N 5/44591 |
| 2008/0141293 A1 | 6/2008 | Blanchard et al. |
| 2010/0153885 A1 | 6/2010 | Yates |
| 2011/0016492 A1 | 1/2011 | Morita |
| 2011/0142059 A1 | 6/2011 | Bedingfield et al. |
| 2013/0145400 A1 | 6/2013 | Chang et al. |
| 2013/0263001 A1 | 10/2013 | Doronichev et al. |
| 2013/0332521 A1 | 12/2013 | Olague et al. |
| 2014/0007154 A1 | 1/2014 | Seibold et al. |
| 2014/0007192 A1 | 1/2014 | Qureshi et al. |
| 2014/0185499 A1 | 7/2014 | Ray et al. |
| 2014/0310349 A1 | 10/2014 | Rainisto |
| 2015/0264169 A1 | 9/2015 | Yim et al. |
| 2015/0319168 A1 | 11/2015 | McCarty et al. |
| 2015/0350201 A1 * | 12/2015 | Cornell ............... H04L 63/0861 726/7 |

* cited by examiner

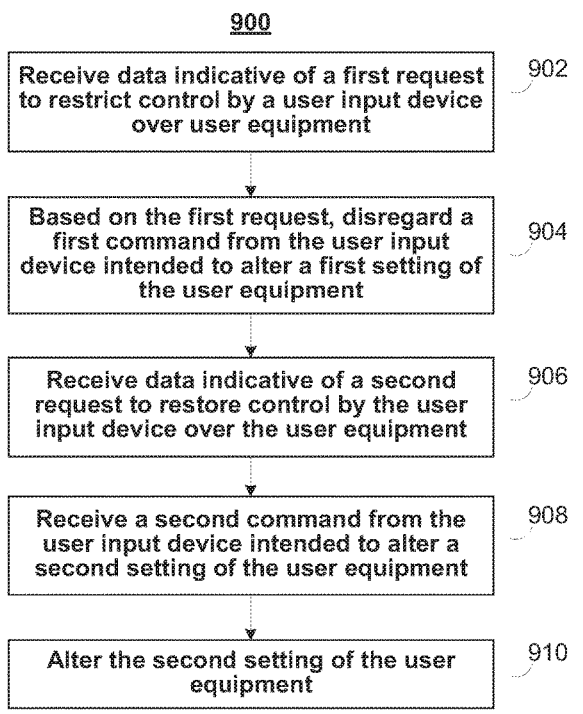
FIG. 9
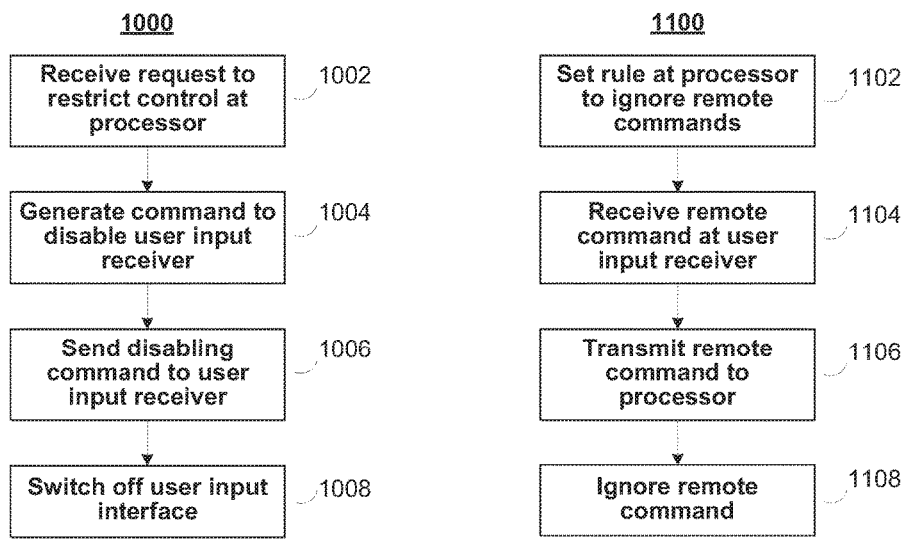
FIG. 10
FIG. 11

METHODS AND SYSTEMS FOR PREVENTING A USER INPUT DEVICE FROM CONTROLLING USER EQUIPMENT

CROSS-REFERENCE TO RELATED APPLICATION

This application is a continuation application of U.S. patent application Ser. No. 15/248,476, filed Aug. 26, 2016 (now pending), the disclosure of which is hereby incorporated by reference herein in its entirety.

BACKGROUND

Mechanisms for controlling media equipment are proliferating. For example, users can use remote controls, smart phones, tablets, computers, and vocal commands to control media equipment. Often, individuals in a household each have access to one or more of these devices that can all control the same media equipment. At present, there are specialized remote controls that can be enabled and disabled. However, there is no mechanism for controlling, at the media equipment, which devices and/or which users can control the media equipment.

SUMMARY

Methods and systems are provided herein for preventing a user input device from controlling user equipment. A user may wish to prevent another user, such as the user's child, from controlling the user equipment. For example, a parent may put on "Dora the Explorer" for a child to watch, and would like to prevent the child from changing to a different program, raising the volume, or any other inputs. Conventionally, the parent could take the remote control away from the child, or hide the remote control. Alternatively, the parent could purchase a specialized remote control that can be locked. These current methods are inconvenient to the parent. Furthermore, unlike in the past where only a remote control could control a television, many devices are now able to control user equipment. For example, a single television could be controlled by multiple remote controls, one or more apps on smartphones or tablets, voice control, and other suitable remote control mechanisms. With more ways to control user equipment, it is becoming increasingly difficult for a parent to remove or lock all available control devices. It would be easier for the parent to program a single restriction at the user equipment than to disable and/or remove all control devices from the child's presence.

For example, a parent could issue a request, received by the user equipment, to restrict control of the user equipment. Responsive to this request, the user equipment will disregard incoming commands. For example, the user equipment could turn off or disable receiving circuitry for receiving user commands. Alternatively, the user equipment could set a rule to disregard all user commands, or to disregard some subset of user commands (e.g., based on the user, the type of command, or the device from which the command issued). This way, with only a single command to the user equipment, the parent can limit control of the user equipment. The parent could later issue a second request that permits control of the user equipment. The user equipment would then reverse its earlier action by turning on or enabling the receiving circuitry, or removing the rule to disregard all or some user commands.

In some aspects, methods and systems are provided herein for a user equipment for preventing a user input device from controlling the user equipment. The user equipment receives, over a first communication path, data indicative of a first request to restrict control by the user input device over the user equipment. For example, before the parent leaves the room, the parent issues a request, received by the user equipment, to restrict control of the user equipment.

In response to receiving the first request, the user equipment disregards a first command from the user input device, the first command intended to alter a first setting of the user equipment. For example, after receiving the request from the parent, the user equipment receives a command issued by the child via a remote control to change the channel. The user equipment disregards this command.

The user equipment receives, over the first communication path, data indicative of a second request to restore control by the user input device over the user equipment. For example, the parent may return to the room and, wishing to permit the child to use the remote control, may issue a request to restore control of the user equipment.

In response to receiving the second request, the user equipment receives a second command from the user input device, the second command intended to alter a second setting of the user equipment. For example, the user equipment receives a command issued by the child via the remote control to change the volume.

In response to receiving the second request and the second command, the user equipment alters the second setting of the user equipment. For example, responsive to receiving the parent's request to restore control by the remote control and the child's command to change the volume via the remote control, the user equipment changes the volume as requested by the child.

In some embodiments, the first request comprises one or more verbal commands received from a user. For example, the user may state the verbal instruction "Don't allow Boris to change the channel" The user equipment will process this instruction and thereafter will not respond to channel change requests from Boris.

In some embodiments, the first communication path comprises a local area network, and the first request and the second request are received from a network-connected user device. For example, the first request and the second request may be received from a user's smart phone, which can transmit the first and second requests to the user equipment over a local Wi-Fi network or other suitable network.

In some embodiments, in response to receiving the first request, the user equipment deactivates a receiver circuitry coupled to the user equipment, the receiver circuitry being usable to receive commands from the user input device over a second communications path. In some embodiments, the receiver circuitry comprises at least one of an infrared sensor, a radio frequency sensor, and circuitry for operating a sensor. For example, if the user equipment is controlled by an infrared remote control, then in order to disregard commands from the remote control, the user equipment will deactivate or turn off the infrared receiver.

In some embodiments, disregarding a first command from the user input device comprises the steps of determining an identity of a first user, wherein the first request comprises input received from the first user; determining, based on the identity of the first user, that the first user is authorized to restrict control; and disregarding the first command from the user input device in response to determining that the first user is authorized to restrict control. Determining the identity of the first user may involve applying voice pattern recognition to a verbal input received from the first user, applying facial recognition techniques to an image of the first user, applying fingerprint recognition techniques when a user picks up or presses a button or sensor on a user input device, or another suitable technique. For example, if the user equipment receives a spoken command from a parent to restrict control, the user equipment will use voice recognition to determine that the speaker is the parent, determine that the parent is authorized to restrict control, and then disregard commands that are received at the user equipment.

In some embodiments, the user equipment may determine the identity of a second user who is different from the first user. The user equipment determines, based on the identity of the second user, that the second user is authorized to restore control. For example, if a mother initially restricts the user equipment, a father (but not a child) may be permitted to restore control.

In some embodiments, when the user equipment disregards the first command, the user equipment generates for display, on a display coupled to the user equipment, a visual indicator that the user input device has been prevented from controlling the user equipment. For example, a television screen may display a notification "Remote Control Disabled" when the user equipment is set to disregard commands from the remote control.

In some embodiments, the user equipment stores a rule at the user equipment identifying one or more properties of a user command to be disregarded. When the user equipment receives the first command from the user input device, it compares the first command to the rule and disregards the first command from the user input device if a property of the first command matches a property of the rule. For example, if the rule indicates that all requests to change the volume are ignored, and the user equipment receives a command to increase the volume, the user equipment compares the command to the rule and, after determining that the requested command matches the rule indicating what commands are restricted, disregards the command.

It should be noted that the systems and/or methods described above may be applied to, or used in accordance with other systems, methods, and/or apparatuses in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 9 is a flowchart of illustrative steps involved in preventing the use of a user input device, in accordance with some embodiments of the disclosure;

FIG. 10 is a flowchart of illustrative steps for restricting control by a user input device, in accordance with some embodiments of the disclosure;

FIG. 11 is a flowchart of illustrative steps for restricting control by a user input device, in accordance with some embodiments of the disclosure;

DETAILED DESCRIPTION

Methods and systems for preventing a user input device from exerting control over user equipment are described herein. User equipment receives a request from a first user to prevent a user input device from exerting control over the user equipment. Responsive to the request, the user equipment prevents the user input device from exerting control over the user equipment. For example, the user equipment may disable or turn off a receiver in the user equipment that receives commands from the user input device. As another example, the user equipment may receive commands from the user input device, but ignore some or all of the received commands. Unlike prior systems that involved a specialized remote control that can be disabled, in this system, the user equipment is altered to be unresponsive to some or all commands received from a user input device. Accordingly, the user equipment can prevent control from a variety of user input devices, e.g., one or more of remote controls provided with the user equipment, universal remote controls, mobile phones, tablets, video game controllers, voice commands, etc.

The user request to restrict control may be received from the first user as a signal transmitted from a device used by the first user, such as a mobile phone or tablet. Alternatively, the user request to restrict control may be a vocal command said aloud by the user. The user request may be transmitted directly from the user to the user equipment, or it may pass through intermediate circuitry and/or equipment, such as a router and/or server. If the first user wishes to resume control of the user equipment by the deactivated user input device, the user may issue a request to allow a user input device to exert control over the user equipment.

Figure 1:
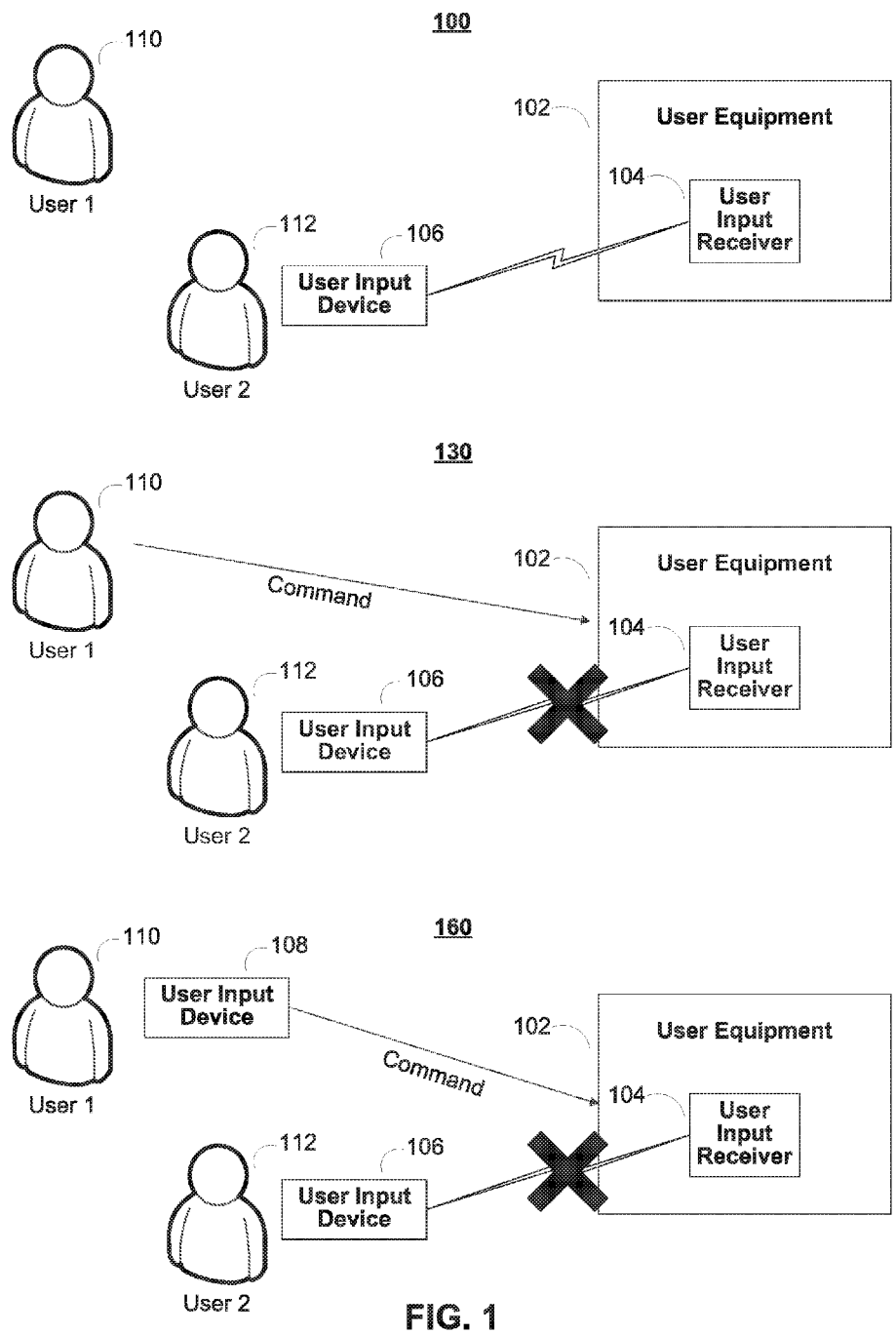
FIG. 1 shows block diagrams of illustrative systems for preventing the use of a user input device, in accordance with some embodiments of the disclosure.

FIG. 1 shows a block diagram of system 100 in which user equipment, such as user equipment 102, can prevent the use of a user input device, such as user input device 106. FIG. 1 shows two users, User 1 110 and User 2 112. User 2 112 has control of user input device 106. As shown in system 100, user input device 106 is in communication with user equipment 102. The communication may be bidirectional or unidirectional.

User equipment 102 may be any device for accessing media content. For example, user equipment 102 may be a television, set-top box, Smart TV, streaming media device, or computer. Various additional types and functionalities of user equipment are described in detail below with respect to FIGS. 5-8. User equipment 102 is responsive to user commands for interacting with the user equipment 102 and/or a media guidance application implemented on the user equipment 102. Media guidance applications are described in further detail below with respect to FIGS. 5-8. Exemplary commands that may be received by the user equipment 102 include commands for navigating through and selecting media; playing, pausing, rewinding, and fast forwarding media; adjusting volume; and adjusting display settings.

User equipment 102 includes user input receiver 104 for receiving these sorts of commands. User input receiver 104 may be, for example, an infrared (IR) receiver, a radio frequency (RF) receiver, a Wi-Fi receiver, or any other sort of wireless receiver. User input receiver 104 may support a particular wireless communications protocol, such as BLUETOOTH, ZIGBEE, or Z-WAVE. User 2 has a user input device 106 for sending commands to the user input receiver 104 in a compatible format. In some embodiments, user equipment 102 includes multiple input receivers 104 for receiving different types of input. User input device 106 may be similar to user input interface 710, described with respect to FIG. 7. User input device 106 may include any suitable user interface, such as a remote control, mouse, trackball, keypad, keyboard, touch screen, touchpad, stylus input, joystick, voice recognition interface, or other user input interface. User input device 106 may be a dedicated device for interacting with user equipment, such as a remote control or video game controller, or it may be a multi-purpose device, such as a mobile phone or tablet.

User input device 106 may transmit commands directly to the user input receiver 104 through a wired or wireless connection, or the command may pass through intermediate channels or devices. For example, if line-of-sight is required by an IR receiver, an IR extender may be used. As another example, if user input device 106 communicates over Wi-Fi or another wireless communications protocol, the user input device 106 may transmit a signal to a local network device, such as a router, which transmits it to the user equipment 102. As another example, if user input device 106 communicates over 4G, the user input device 106 may transmit a signal through a cellular network before it reaches user equipment 102. The command may travel through one or more local-area or wide-area networks before reaching user equipment 102.

In some embodiments, User 2 112 may not have a user input device 106, and instead interacts with user equipment 102 directly. For example, user input receiver 104 may be a sensor for voice, sound, image, or movement recognition, e.g., to recognize verbal or gesture commands. User input receiver 104 or user equipment 102 may include voice recognition, face recognition, or other sorts of recognition capabilities to identify User 2 112. Alternatively, user input receiver 104 may simply be a button or other physical sensor on user equipment 102 that can be directly activated by User 2 112.

As shown in system 100, user input device 106 is able to communicate with user input receiver 104. In system 130 of FIG. 1, User 1 110 has issued a command to user equipment 102, and in response, user input device 106 is no longer able to communicate with user input receiver 104, as indicated by the X over the communications link. In particular, user equipment 102 is no longer responsive to commands from user input device 106. This may be accomplished in one of several ways. User equipment 102 may turn off user input receiver 104. Alternatively, user equipment 102 may ignore all signals received from user input receiver 104. User equipment 102 may instead ignore some signals received from user input receiver 104 based on the properties of the received signal. For example, user equipment 102 may ignore signals received based on one or more of (1) the device that issued the command; (2) the user who issued the command; and (3) the type of command that was issued. In this case, user equipment 102 stores in memory rules regarding how to handle incoming signals, compares the received command to the stored rules, and either performs or ignores the command.

The command from User 1 110 to the user equipment 102 may be issued directly from User 1 110. For example, User 1 110 may issue a verbal or gestural command that is received by user equipment 102. The command may be received by user input receiver 104, which may include a sensor for voice, sound, image, or movement recognition. User input receiver 104 or user equipment 102 may include voice recognition, face recognition, or other sorts of recognition capabilities to identify User 1. Alternatively, User 1 110 may issue the command through a button or other physical sensor on user equipment 102 that can be directly activated by User 1 110.

As shown in system 160 of FIG. 1, User 1 may instead issue the command through user input device 108. User input device 108 may be, for example, a mobile phone, tablet, remote control, or video game controller that is operated by and may be associated with User 1 110. User input device 108 may be a home automation device, such as an AMAZON ECHO, NEST, LEVITON, ELK, or ZIPATO device, in communication with user equipment 102. User input device 108 may be similar to user input device 106, or user input device 108 may be a different type of device from user input device 106. If user input device 108 is able to discern from whom it is receiving commands (e.g., through voice recognition, facial recognition, fingerprint or thumbprint recognition), user input device 108 and user input device 106 may be the same device. In this way, User 1 can issue a command to prevent control by User 2 with the same user input device 106 or 108. As with user input device 106, user input device 108 may communicate directly with user equipment 102, or the communications may travel through one or more intermediary devices and/or channels, such as routers or servers.

User 1 110 need not prevent control by another user. For example, if user input device 106 is malfunctioning, or if User 1 tends to sit on the remote control and issue accidental commands, User 1 may want to prevent user equipment 102 from responding to mistaken commands from user input device 106. As another example, User 1 may have a pet that plays with or otherwise interacts with user input device 106, and User 1 may wish to prevent the pet from issuing commands.

Figure 2:
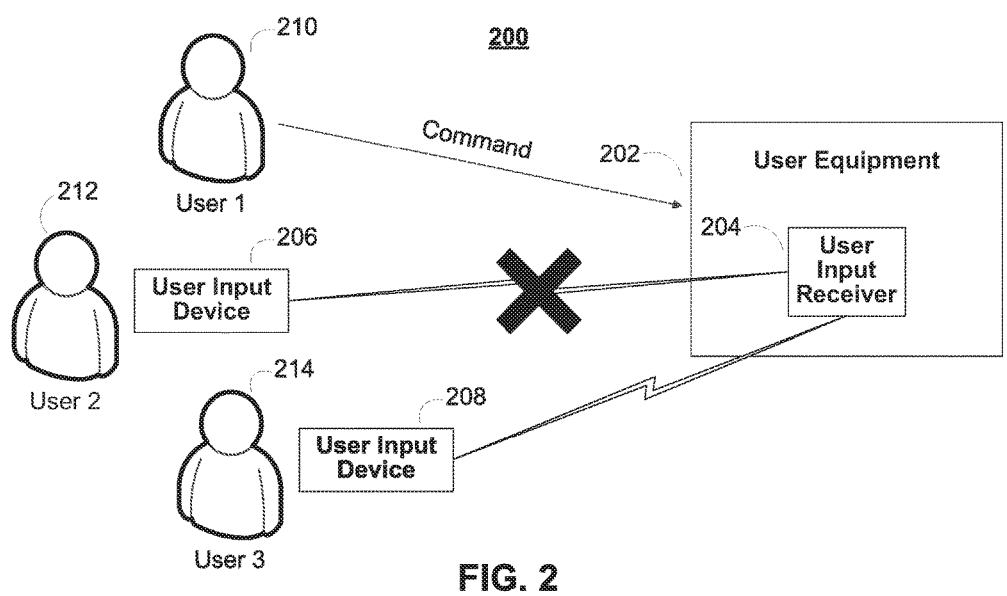
FIG. 2 shows a block diagram of an illustrative system for preventing the use of a user input device, in accordance with some embodiments of the disclosure.

FIG. 2 shows a block diagram of an illustrative system 200 for preventing one user, User 2 212, from controlling user equipment 202, while allowing a second user, User 3 214, to control user equipment 202. As in system 130, User 1 210 has issued a command that prevents User 2 212 from controlling user equipment 202 with user input device 206. However, User 3 214 is still able to communicate with user input receiver 204 to control user equipment 202 with user input device 208.

This may be accomplished in several ways. For example, the command issued by User 1 210 may specify that only User 2 212 cannot control user equipment 202 and/or that User 3 214 may continue to control user equipment 202. To accomplish this, User 1 210 may, for example, issue a verbal command such as "Lock TV for Boris" (where the name of User 2 212 is Boris) or "Lock TV except to Carmen" (where the name of User 3 214 is Carmen). As one alternative, User 1 210 may use an on-screen interface to enter preferences for who may and may not control user equipment 202. If User 1 210 specifies which users can control user equipment 202, then user equipment 202 must be able to distinguish which user is attempting to control user equipment 202. User equipment 202 may have stored in memory data associating different users with different user input devices. Alternatively, user equipment 202 and/or user input devices may use user recognition, such as vocal recognition, facial recognition, or thumbprint or fingerprint recognition, to determine which user is issuing commands.

As another example, rather than specify which users may or may not control user equipment 202, User 1 210 may specify which user input devices may or may not control user equipment 202. For example, User 1 210 may prevent one or more types of input devices from controlling user equipment 202, but continue to allow other types of input devices to control user equipment 202. As one example, User 1 210 may prevent a remote control from controlling user equipment 202, but continue to allow mobile devices to control user equipment 202. Thus, if user input device 206 is a remote control, and user input device 208 is a mobile device, User 3 214 will be able to control user equipment 202, while User 2 212, with the remote control, will not be able to control user equipment 202.

Alternatively, User 1 210 may specify individual input devices that may or may not control user equipment 202. For example, User 1 210 may prevent a mobile phone associated with User 2 212 from controlling user equipment 202, but continue to allow a mobile phone associated with User 3 214 to control user equipment 202. The devices may be associated with the users through personalized login information.

The ability to limit control of user equipment 202 by other users may reside with one or more users with greater privileges, e.g., administrative privileges, than the other users. These privileges may be determined and set by a head of household or by a purchaser of a content service. The user(s) with the ability to limit control of user equipment 202 may be able to set priorities for who can block whom from controlling user equipment 202. For example, a parent may be assigned priority 1, an older child priority 2, and a younger child priority 3. This way, the parent can prevent control by both children, and the older child can prevent control by the younger child. These priorities can be set by the parent through an on-screen or verbal interface. The priorities are stored in a memory of user equipment 202.

Figure 3:
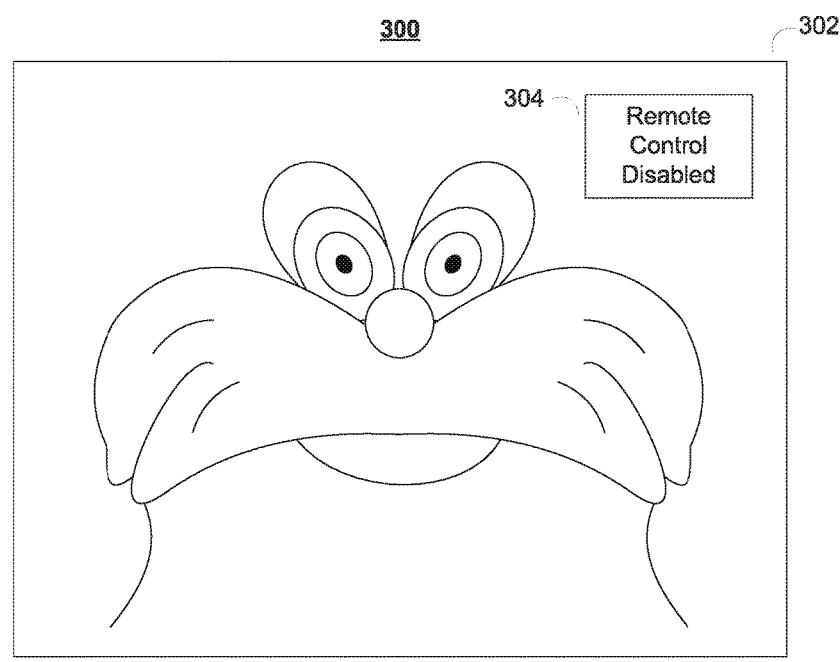
FIG. 3 shows an illustrative example of a display of user equipment displaying a notification that a user input device is disabled, in accordance with some embodiments of the disclosure.

FIG. 3 shows an illustrative example of a display 302 with a notification 304 alerting a user that the user is not permitted to control the user equipment. The display 302 is generated by user equipment, such as user equipment 102 or 202. The notification 304 may be generated based on receiving a command from User 1 to limit control, or it may be generated when a user input device sends a command to the user equipment. If the user input receiver is switched off responsive to User 1's command, the user equipment can then display notification 304 for a set period of time, or until the user input receiver is switched back on.

If the user input receiver is still on and receiving commands, then when a user, such as User 2 212, transmits a command to the user equipment but has been prevented from controlling the user equipment, the user equipment may generate notification 304. For example, if the user is attempting to use a remote control, on-screen notification 304 may read "Remote Control Disabled." This way, the user will know that continued attempts to send commands to user equipment will be fruitless.

Figure 4:
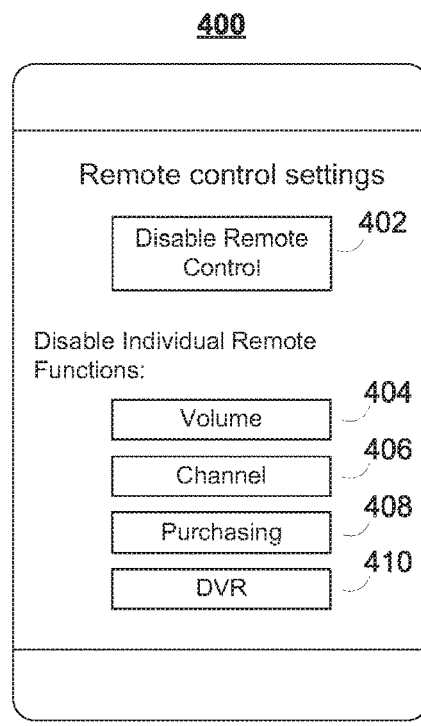
FIG. 4 shows an illustrative example of a display of a user interface for preventing the use of a user input device, in accordance with some embodiments of the disclosure.
Figure 4:
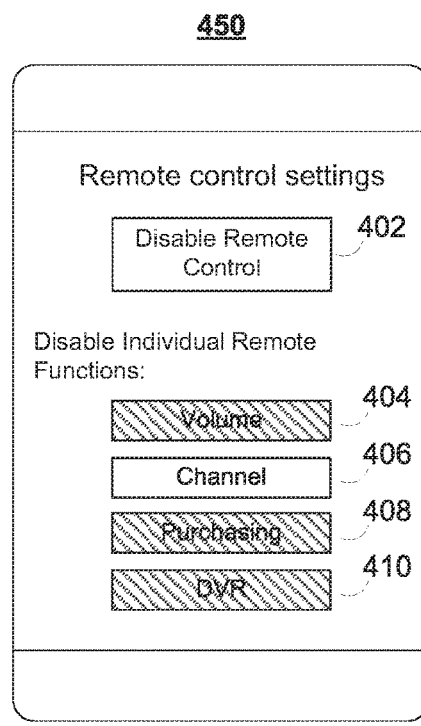

FIG. 4 shows an illustrative example of a display of a user interface 400 for preventing the use of a user input device. User interface may be generated by user input device 108 controlled by User 1. As depicted, the user interface 400 is on a mobile phone or tablet, but similar interfaces may be generated on other types of user devices, or, as discussed above, a user may enter settings without the aid of an on-screen interface, e.g., using voice commands.

As shown in FIG. 4, the user interface 400 is an interface for inputting remote control settings 402. This interface may be used to either prevent a remote control from controlling user equipment (such as user equipment 102 or 202), or by preventing the remote control from controlling certain features. To completely disable control over the user equipment by the remote control, User 1 can tap the Disable Remote Control button 402. Alternatively, User 1 can opt to only limit certain remote control or user equipment features. For example, User 1 may select Volume button 404 to make the user equipment unresponsive to requests to change its volume issued by the remote control. User 1 may select Channel button 406 to make the user equipment unresponsive to requests to change the channel it is currently displaying issued by the remote control. User 1 may select Purchasing button 408 to make the user equipment unresponsive to purchase requests issued by the remote control. User 1 may select DVR button 410 to make the user equipment unresponsive to requests to change DVR settings issued by the remote control. Additional or alternative buttons related to different user equipment settings and options may be included.

If User 1 selects the Disable Remote Control 402 button, the user equipment may switch off its user input receiver, or it may ignore all commands received from the remote control. As described with respect to FIG. 3, the user equipment may display an alert that control is disabled when it receives a command from a remote control.

If User 1 selects to disable individual remote functions using any of buttons 404-410, then user equipment will respond to some commands but not others. Note that some commands may not be directly issued by the remote control. For example, the remote control may not have a "Purchase" button. Instead, to make a purchase, a user may navigate an on-screen interface using arrow buttons and an Enter or Select button. The user equipment cannot simply ignore all Enter/Select commands from the remote control; it instead must be aware of the menu displayed, and if it determines that the Enter/Select command sent by the remote control corresponds to a purchase request, it ignores the purchase request.

As shown in user interface 450, User 1 has selected to disable volume control, purchasing control, and DVR control, but continues to allow channel control. A parent may set the remote control settings this way to permit a child to flip through the channels, but to ensure that the volume stays low, and to prevent the child from making purchases or changing the parent's DVR requests. With this sort of interface, the parent can decide how much control to give the child.

Similar interfaces may be used to dictate the level of control permitted by other devices besides a remote control. For example, User 1 may access similar menus for each device and/or each user that is ordinarily able to control the user equipment. Each of these settings entered by User 1 is transmitted to and stored as rules by the user equipment, and the user equipment compares the rules to any incoming commands to determine whether the command is permitted.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 5:
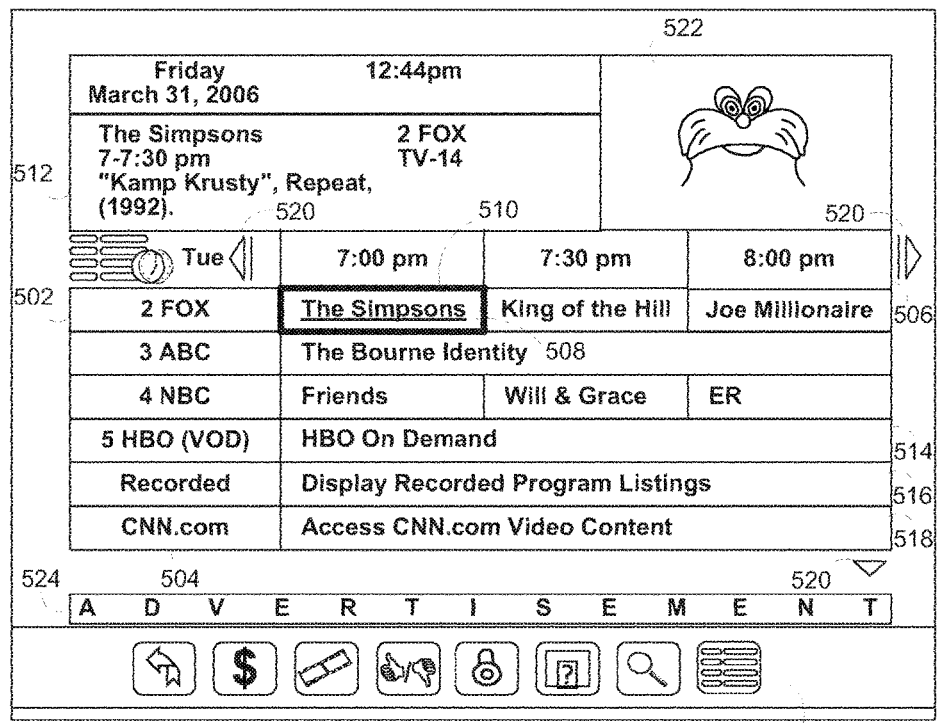
FIG. 5 shows an illustrative example of a display screen generated by a media guidance application, in accordance with some embodiments of the disclosure.
Figure 6:
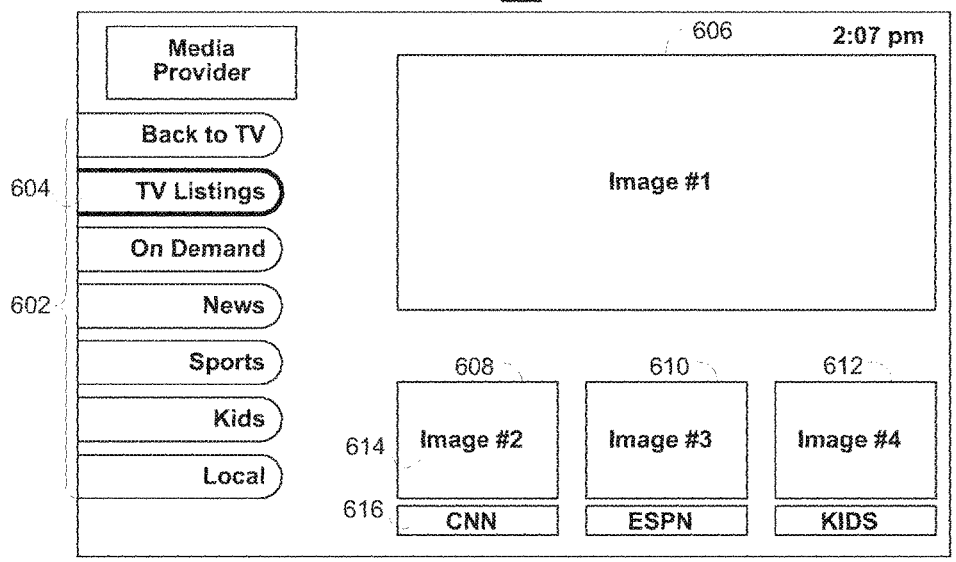
FIG. 6 shows another illustrative example of a display screen generated by a media guidance application, in accordance with some embodiments of the disclosure.

FIGS. 5-6 show illustrative display screens that may be used to provide media guidance data. The display screens shown in FIGS. 5-6 may be implemented on any suitable user equipment device or platform. While the displays of FIGS. 5-6 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 5 shows illustrative grid of a program listings display 500 arranged by time and channel that also enables access to different types of content in a single display. Display 500 may include grid 502 with: (1) a column of channel/content type identifiers 504, where each channel/content type identifier (which is a cell in the column) identifies a different channel or content type available; and (2) a row of time identifiers 506, where each time identifier (which is a cell in the row) identifies a time block of programming. Grid 502 also includes cells of program listings, such as program listing 508, where each listing provides the title of the program provided on the listing's associated channel and time. With a user input device, a user can select program listings by moving highlight region 510. Information relating to the program listing selected by highlight region 510 may be provided in program information region 512. Region 512 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 502 may provide media guidance data for non-linear programming including on-demand listing 514, recorded content listing 516, and Internet content listing 518. A display combining media guidance data for content from different types of content sources is sometimes referred to as a "mixed-media" display. Various permutations of the types of media guidance data that may be displayed that are different than display 500 may be based on user selection or guidance application definition (e.g., a display of only recorded and broadcast listings, only on-demand and broadcast listings, etc.). As illustrated, listings 514, 516, and 518 are shown as spanning the entire time block displayed in grid 502 to indicate that selection of these listings may provide access to a display dedicated to on-demand listings, recorded listings, or Internet listings, respectively. In some embodiments, listings for these content types may be included directly in grid 502. Additional media guidance data may be displayed in response to the user selecting one of the navigational icons 520. (Pressing an arrow key on a user input device may affect the display in a similar manner as selecting navigational icons 520.)

Display 500 may also include video region 522, and options region 526. Video region 522 may allow the user to view and/or preview programs that are currently available, will be available, or were available to the user. The content of video region 522 may correspond to, or be independent from, one of the listings displayed in grid 502. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 526 may allow the user to access different types of content, media guidance application displays, and/or media guidance application features. Options region 526 may be part of display 500 (and other display screens described herein), or may be invoked by a user by selecting an on-screen option or pressing a dedicated or assignable button on a user input device. The selectable options within options region 526 may concern features related to program listings in grid 502 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 8. Additional personalized media guidance application features are described in greater detail in Ellis et al., U.S. Patent Application Publication No.

2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 6. Video mosaic display 600 includes selectable options 602 for content information organized based on content type, genre, and/or other organization criteria. In display 600, television listings option 604 is selected, thus providing listings 606, 608, 610, and 612 as broadcast program listings. In display 600 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 608 may include more than one portion, including media portion 614 and text portion 616. Media portion 614 and/or text portion 616 may be selectable to view content in full-screen or to view information related to the content displayed in media portion 614 (e.g., to view listings for the channel that the video is displayed on).

The listings in display 600 are of different sizes (i.e., listing 606 is larger than listings 608, 610, and 612), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 7:
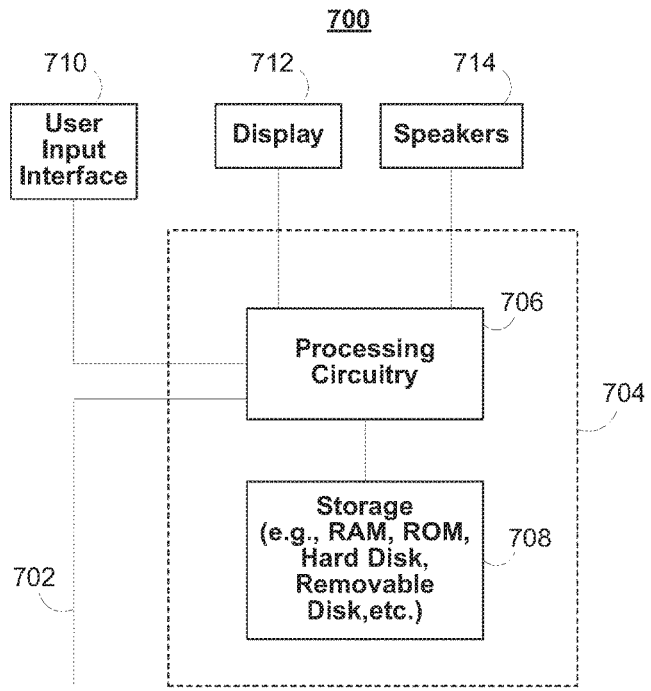
FIG. 7 is a block diagram of an illustrative user equipment device, in accordance with some embodiments of the disclosure.

Users may access content and the media guidance application (and its display screens described above and below) from one or more of their user equipment devices. FIG. 7 shows a generalized embodiment of illustrative user equipment device 700. More specific implementations of user equipment devices are discussed below in connection with FIG. 8. User equipment device 700 may receive content and data via input/output (hereinafter "I/O") path 702. I/O path 702 may provide content (e.g., broadcast programming, on-demand programming, Internet content, content available over a local area network (LAN) or wide area network (WAN), and/or other content) and data to control circuitry 704, which includes processing circuitry 706 and storage 708. Control circuitry 704 may be used to send and receive commands, requests, and other suitable data using I/O path 702. I/O path 702 may connect control circuitry 704 (and specifically processing circuitry 706) to one or more communications paths (described below). I/O functions may be provided by one or more of these communications paths, but are shown as a single path in FIG. 7 to avoid overcomplicating the drawing.

Control circuitry 704 may be based on any suitable processing circuitry such as processing circuitry 706. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 704 executes instructions for a media guidance application stored in memory (i.e., storage 708). Specifically, control circuitry 704 may be instructed by the media guidance application to perform the functions discussed above and below. For example, the media guidance application may provide instructions to control circuitry 704 to generate the media guidance displays. In some implementations, any action performed by control circuitry 704 may be based on instructions received from the media guidance application.

In client-server based embodiments, control circuitry 704 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 8). In addition, communications circuitry may include circuitry that enables peer-to-peer communication of user equipment devices, or communication of user equipment devices in locations remote from each other (described in more detail below).

Memory may be an electronic storage device provided as storage 708 that is part of control circuitry 704. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 708 may be used to store various types of content described herein as well as media guidance data described above. Nonvolatile memory may also be used (e.g., to launch a boot-up routine and other instructions). Cloud-based storage, described in relation to FIG. 8, may be used to supplement storage 708 or instead of storage 708.

Control circuitry 704 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 704 may also include scaler circuitry for upconverting and downconverting content into the preferred output format of the user equipment device 700. Control circuitry 704 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 708 is provided as a separate device from user equipment device 700, the tuning and encoding circuitry (including multiple tuners) may be associated with storage 708.

A user may send instructions to control circuitry 704 using user input interface 710. User input interface 710 may be any suitable user interface, such as a remote control, mouse, trackball, keypad, keyboard, touch screen, touchpad, stylus input, joystick, voice recognition interface, or other user input interfaces. Display 712 may be provided as a stand-alone device or integrated with other elements of user equipment device 700. For example, display 712 may be a touchscreen or touch-sensitive display. In such circumstances, user input interface 710 may be integrated with or combined with display 712. Display 712 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 712 may be HDTV-capable. In some embodiments, display 712 may be a 3D display, and the interactive media guidance application and any suitable content may be displayed in 3D. A video card or graphics card may generate the output to the display 712. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 704. The video card may be integrated with the control circuitry 704. Speakers 714 may be provided as integrated with other elements of user equipment device 700 or may be stand-alone units. The audio component of videos and other content displayed on display 712 may be played through speakers 714. In some embodiments, the audio may be distributed to a receiver (not shown), which processes and outputs the audio via speakers 714.

The guidance application may be implemented using any suitable architecture. For example, it may be a stand-alone application wholly-implemented on user equipment device 700. In such an approach, instructions of the application are stored locally (e.g., in storage 708), and data for use by the application is downloaded on a periodic basis (e.g., from an out-of-band feed, from an Internet resource, or using another suitable approach). Control circuitry 704 may retrieve instructions of the application from storage 708 and process the instructions to generate any of the displays discussed herein. Based on the processed instructions, control circuitry 704 may determine what action to perform when input is received from input interface 710. For example, movement of a cursor on a display up/down may be indicated by the processed instructions when input interface 710 indicates that an up/down button was selected.

In some embodiments, the media guidance application is a client-server based application. Data for use by a thick or thin client implemented on user equipment device 700 is retrieved on-demand by issuing requests to a server remote to the user equipment device 700. In one example of a client-server based guidance application, control circuitry 704 runs a web browser that interprets web pages provided by a remote server. For example, the remote server may store the instructions for the application in a storage device. The remote server may process the stored instructions using circuitry (e.g., control circuitry 704) and generate the displays discussed above and below. The client device may receive the displays generated by the remote server and may display the content of the displays locally on equipment device 700. This way, the processing of the instructions is performed remotely by the server while the resulting displays are provided locally on equipment device 700. Equipment device 700 may receive inputs from the user via input interface 710 and transmit those inputs to the remote server for processing and generating the corresponding displays. For example, equipment device 700 may transmit a communication to the remote server indicating that an up/down button was selected via input interface 710. The remote server may process instructions in accordance with that input and generate a display of the application corresponding to the input (e.g., a display that moves a cursor up/down). The generated display is then transmitted to equipment device 700 for presentation to the user.

In some embodiments, the media guidance application is downloaded and interpreted or otherwise run by an interpreter or virtual machine (run by control circuitry 704). In some embodiments, the guidance application may be encoded in the ETV Binary Interchange Format (EBIF), received by control circuitry 704 as part of a suitable feed, and interpreted by a user agent running on control circuitry 704. For example, the guidance application may be an EBIF application. In some embodiments, the guidance application may be defined by a series of JAVA-based files that are received and run by a local virtual machine or other suitable middleware executed by control circuitry 704. In some of such embodiments (e.g., those employing MPEG-2 or other digital media encoding schemes), the guidance application may be, for example, encoded and transmitted in an MPEG-2 object carousel with the MPEG audio and video packets of a program.

Figure 8:
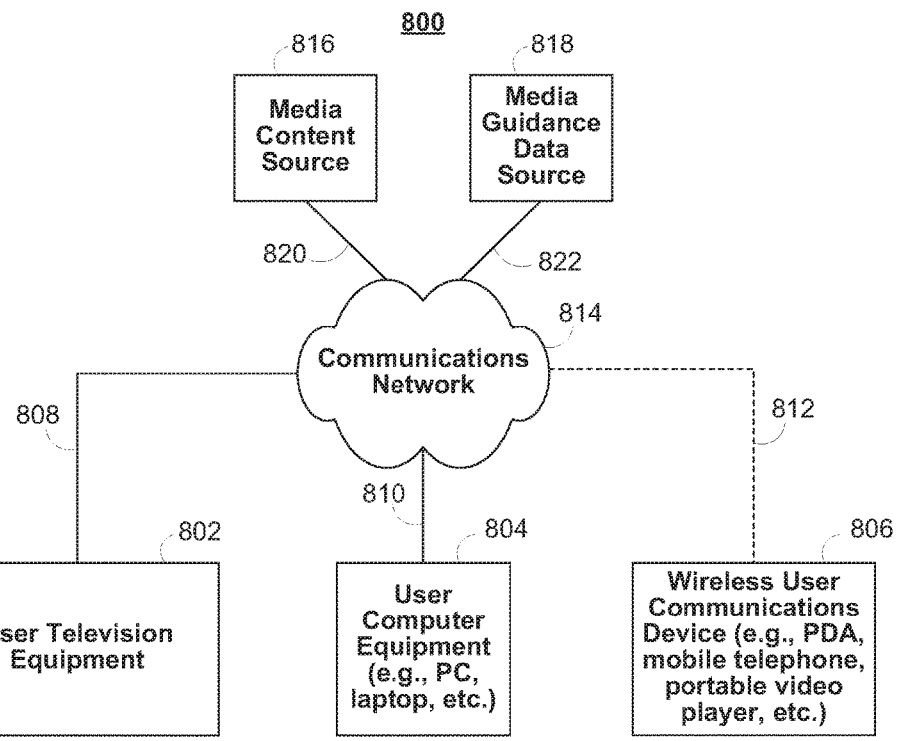
FIG. 8 is a block diagram of an illustrative media system, in accordance with some embodiments of the disclosure.

User equipment device 700 of FIG. 7 can be implemented in system 800 of FIG. 8 as user television equipment 802, user computer equipment 804, wireless user communications device 806, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 7 may not be classified solely as user television equipment 802, user computer equipment 804, or a wireless user communications device 806. For example, user television equipment 802 may, like some user computer equipment 804, be Internet-enabled allowing for access to Internet content, while user computer equipment 804 may, like some television equipment 802, include a tuner allowing for access to television programming. The media guidance application may have the same layout on various different types of user equipment or may be tailored to the display capabilities of the user equipment. For example, on user computer equipment 804, the guidance application may be provided as a web site accessed by a web browser. In another example, the guidance application may be scaled down for wireless user communications devices 806.

In system 800, there is typically more than one of each type of user equipment device but only one of each is shown in FIG. 8 to avoid overcomplicating the drawing. In addition, each user may utilize more than one type of user equipment device and also more than one of each type of user equipment device.

In some embodiments, a user equipment device (e.g., user television equipment 802, user computer equipment 804, wireless user communications device 806) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 814. Namely, user television equipment 802, user computer equipment 804, and wireless user communications device 806 are coupled to communications network 814 via communications paths 808, 810, and 812, respectively. Communications network 814 may be one or more networks including the Internet, a mobile phone network, mobile voice or data network (e.g., a 4G or LTE network), cable network, public switched telephone network, or other types of communications network or combinations of communications networks. Paths 808, 810, and 812 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 812 is drawn with dotted lines to indicate that in the exemplary embodiment shown in FIG. 8 it is a wireless path and paths 808 and 810 are drawn as solid lines to indicate they are wired paths (although these paths may be wireless paths, if desired). Communications with the user equipment devices may be provided by one or more of these communications paths, but are shown as a single path in FIG. 8 to avoid overcomplicating the drawing.

Although communications paths are not drawn between user equipment devices, these devices may communicate directly with each other via communication paths, such as those described above in connection with paths 808, 810, and 812, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 814.

System 800 includes content source 816 and media guidance data source 818 coupled to communications network 814 via communication paths 820 and 822, respectively. Paths 820 and 822 may include any of the communication paths described above in connection with paths 808, 810, and 812. Communications with the content source 816 and media guidance data source 818 may be exchanged over one or more communications paths, but are shown as a single path in FIG. 8 to avoid overcomplicating the drawing. In addition, there may be more than one of each of content source 816 and media guidance data source 818, but only one of each is shown in FIG. 8 to avoid overcomplicating the drawing. (The different types of each of these sources are discussed below.) If desired, content source 816 and media guidance data source 818 may be integrated as one source device. Although communications between sources 816 and 818 with user equipment devices 802, 804, and 806 are shown as through communications network 814, in some embodiments, sources 816 and 818 may communicate directly with user equipment devices 802, 804, and 806 via communication paths (not shown) such as those described above in connection with paths 808, 810, and 812.

Content source 816 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 816 may be the originator of content (e.g., a television broadcaster, a Webcast provider, etc.) or may not be the originator of content (e.g., an on-demand content provider, an Internet provider of content of broadcast programs for downloading, etc.). Content source 816 may include cable sources, satellite providers, on-demand providers, Internet providers, over-the-top content providers, or other providers of content. Content source 816 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 818 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 818 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 818 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 818 may provide user equipment devices 802, 804, and 806 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 708, and executed by control circuitry 704 of a user equipment device 700. In some embodiments, media guidance applications may be client-server applications where only a client application resides on the user equipment device, and server application resides on a remote server. For example, media guidance applications may be implemented partially as a client application on control circuitry 704 of user equipment device 700 and partially on a remote server as a server application (e.g., media guidance data source 818) running on control circuitry of the remote server. When executed by control circuitry of the remote server (such as media guidance data source 818), the media guidance application may instruct the control circuitry to generate the guidance application displays and transmit the generated displays to the user equipment devices. The server application may instruct the control circuitry of the media guidance data source 818 to transmit data for storage on the user equipment. The client application may instruct control circuitry of the receiving user equipment to generate the guidance application displays.

Content and/or media guidance data delivered to user equipment devices 802, 804, and 806 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

System 800 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 8.

In one approach, user equipment devices may communicate with each other within a home network. User equipment devices can communicate with each other directly via short-range point-to-point communication schemes described above, via indirect paths through a hub or other similar device provided on a home network, or via communications network 814. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 816 to access content. Specifically, within a home, users of user television equipment 802 and user computer equipment 804 may access the media guidance application to navigate among and locate desirable content. Users may also access the media guidance application outside of the home using wireless user communications devices 806 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 814. These cloud resources may include one or more content sources 816 and one or more media guidance data sources 818. In addition or in the alternative, the remote computing sites may include other user equipment devices, such as user television equipment 802, user computer equipment 804, and wireless user communications device 806. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 804 or wireless user communications device 806 having content capture feature. Alternatively, the user can first transfer the content to a user equipment device, such as user computer equipment 804. The user equipment device storing the content uploads the content to the cloud using a data transmission service on communications network 814. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 7.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

FIG. 9 is a flowchart of illustrative steps involved in preventing the use of a user input device, in accordance with some embodiments of the disclosure. FIG. 9 presents a process for control circuitry (e.g., control circuitry 704) of user equipment (such as user equipment 102 or 202) to restrict or permit control by a user or a user input device. In some embodiments, this algorithm may be encoded on to a non-transitory storage medium (e.g., storage 708) as a set of instructions to be decoded and executed by processing circuitry (e.g., processing circuitry 706). Processing circuitry may, in turn, provide instructions to other sub-circuits contained within control circuitry 704, such as the tuning, video generating, encoding, decoding, encrypting, decrypting, scaling, analog/digital conversion circuitry, and the like.

At step 902, control circuitry 704 receives data indicative of a first request to restrict control by a user input device over the user equipment. For example, a user input receiver of user equipment may receive a request and transmit it to control circuitry 704, which processes the request. As described with respect to FIGS. 1-4, the request may include information about what is restricted, e.g., which devices, which users, and/or which functions are restricted.

At step 904, based on the first request, the control circuitry 704 disregards a first command from the user input device intended to alter a first setting of the user equipment. Control circuitry 704 may restrict control in one of several ways, which causes it to disregard the first command. For example, control circuitry 704 may turn off or disable the user input receiver, or it may set rules that cause it to ignore some or all commands received at the user equipment. Exemplary processes for restricting control are described in further detail with respect to FIGS. 10 and 11. After control has been restricted, a first command intended to alter a first setting of the user equipment is transmitted from the user input device and is disregarded at the user equipment. For example, the first command may be intended to alter a display screen, the media that is playing, playback speed, volume, or a display setting.

At step 906, control circuitry 704 receives data indicative of a second request to restore control by the user input device over the user equipment. For example, a user input receiver of user equipment may receive this request and transmit it to control circuitry 704, which processes the request.

At step 908, control circuitry 704 receives a second command from the user input device intended to alter a second setting of the user equipment. For example, the first command may be intended to alter a display screen, the media that is playing, playback speed, volume, or a display setting.

At step 910, control circuitry 704 alters the second setting of the user equipment, responsive to the request to restore control over the user equipment received at step 906 and the second command received at step 910.

FIG. 10 is a flowchart of illustrative steps for restricting control by a user input device, in accordance with some embodiments of the disclosure. FIG. 10 shows a process that may be performed by control circuitry 704 at step 904 in FIG. 9 to restrict control by a user input device after a request to restrict control is received.

At step 1002, the request to restrict control is received at a processor, such as processing circuitry 706. The request may have been first received at a user input receiver within the user equipment and passed to the processor, or it may have been received through a different receiver. For example, user input receiver being disabled may be an IR receiver, and the request to restrict or permit control over the user equipment is received through a Wi-Fi receiver.

At step 1004, control circuitry 704 generates a command to disable the user input interface. For example, control circuitry 704 may generate a command for switching off the user input receiver or reducing power to the user input receiver. In some embodiments, control circuitry 704 may generate a command for switching off part of user input receiver if, e.g., user input receiver receives both an IR and Wi-Fi signal, and only IR commands are being restricted.

At step 1006, control circuitry 704 sends the disabling command to the user input receiver. In some embodiments, the user input receiver may not be able to turn itself off; accordingly, control circuitry 704 may instead send the disabling command to a power supply to the user input receiver to stop the power supply from sending power to the user input receiver.

At step 1008, the user input receiver switches off, or partially switches off or powers down, responsive to the disabling command. After the user input receiver switches off, it will no longer be responsive to commands sent by the user input device. Thus, the user equipment will disregard commands from the user input device.

Although not shown in FIG. 10, the user input receiver can be resumed in a similar manner at step 908. In particular, after control circuitry 704 receives a request to restore control, control circuitry 704 would receive this request, generate a command to reenable (e.g., resume power to) the user input receiver, and send a command to return power to the user input receiver. The command may be transmitted to the user input receiver, which can turn itself on, or may be transmitted to a power supply, which switches power back to the user input receiver. The user input receiver then switches back on and can begin receiving commands.

FIG. 11 is a flowchart of illustrative steps of another process for restricting control by a user input device, in accordance with some embodiments of the disclosure. FIG. 11 shows an alternative process that may be performed by control circuitry 704 and user input receiver at step 904 in FIG. 9 to restrict control by a user input device after a request to restrict control is received. In this process, the control circuitry 704 continues to receive commands from a user input device, but ignores these commands while control is restricted.

At step 1102, the processor, such as control circuitry 704, sets one or more rules to ignore remote commands received from a user input device. The rule may be stored in the processing circuitry 706 or in the storage 708. The rule is set responsive to the request to restrict control at step 902 in FIG. 9. The rule may specify that control circuitry 704 ignore all remote commands, or that control circuitry 704 ignore only some remote commands.

At step 1104, the user input receiver receives a remote command from the user input device. For example, the user input receiver may receive a navigation, volume, channel, playback, or other type of command. The user input receiver may convert the received signal (e.g., an IR signal) to a signal that can be received by control circuitry 704.

At step 1106, the user input receiver transmits the remote command to the processor, e.g., control circuitry 704. The user input receiver may transmit a signal to control circuitry 704 representing a navigation, volume, channel, playback, or other type of command.

At step 1108, the control circuitry 704 ignores the remote command. In particular, the control circuitry 704 receives the remote command, but because it has set a rule to ignore remote commands, it does not take any action to carry out the requested command. The rule may specify that control circuitry 704 ignore all remote commands, or that control circuitry 704 ignore only some remote commands. In the latter case, control circuitry 704 will compare the received command to the set of rules to determine whether or not to ignore the command. This process is described in further detail with respect to FIG. 13.

Although not shown in FIG. 11, control by the user input device can be resumed by reversing the rule at step 908. In particular, after control circuitry 704 receives a request to restore control, control circuitry 704 removes the rule to ignore remote commands received from a user input device, or sets a rule to accept remote commands received from a user input device.

In some embodiments, control by the user input device can be resumed automatically rather than in response to a request to restore control. For example, the control circuitry 704 may permit control by a restricted user input device after a set period of time, e.g., 5 minutes, 30 minutes, 1 hour, etc. Alternatively, control circuitry 704 may allow control after a program has ended. The user restricting control may be able to specify for how long control should be restricted, e.g., by providing a verbal command or an on-screen interface allowing a user to specify a time or trigger (e.g., the ending of a program) after which control should be allowed.

In some embodiments, control by the user input device can be resumed by some user action that is not an explicit request to restore control. For example, control circuitry 704 may resume control after an authorized user, such as the user who restricted control, sends any sort of command to the user equipment (e.g., a command for changing a channel, changing the volume, adjusting another setting, etc.). Alternatively, control circuitry 704 may resume control when it detects the presence of an authorized user using, e.g., voice detection, facial recognition, fingerprint recognition, or proximity to a device (e.g., a smartphone) belonging to the authorized user. Control circuitry 704 may detect the authorized user directly, or it may receive information from another device, such as a user input device, indicating the presence of the authorized user.

Figure 12:
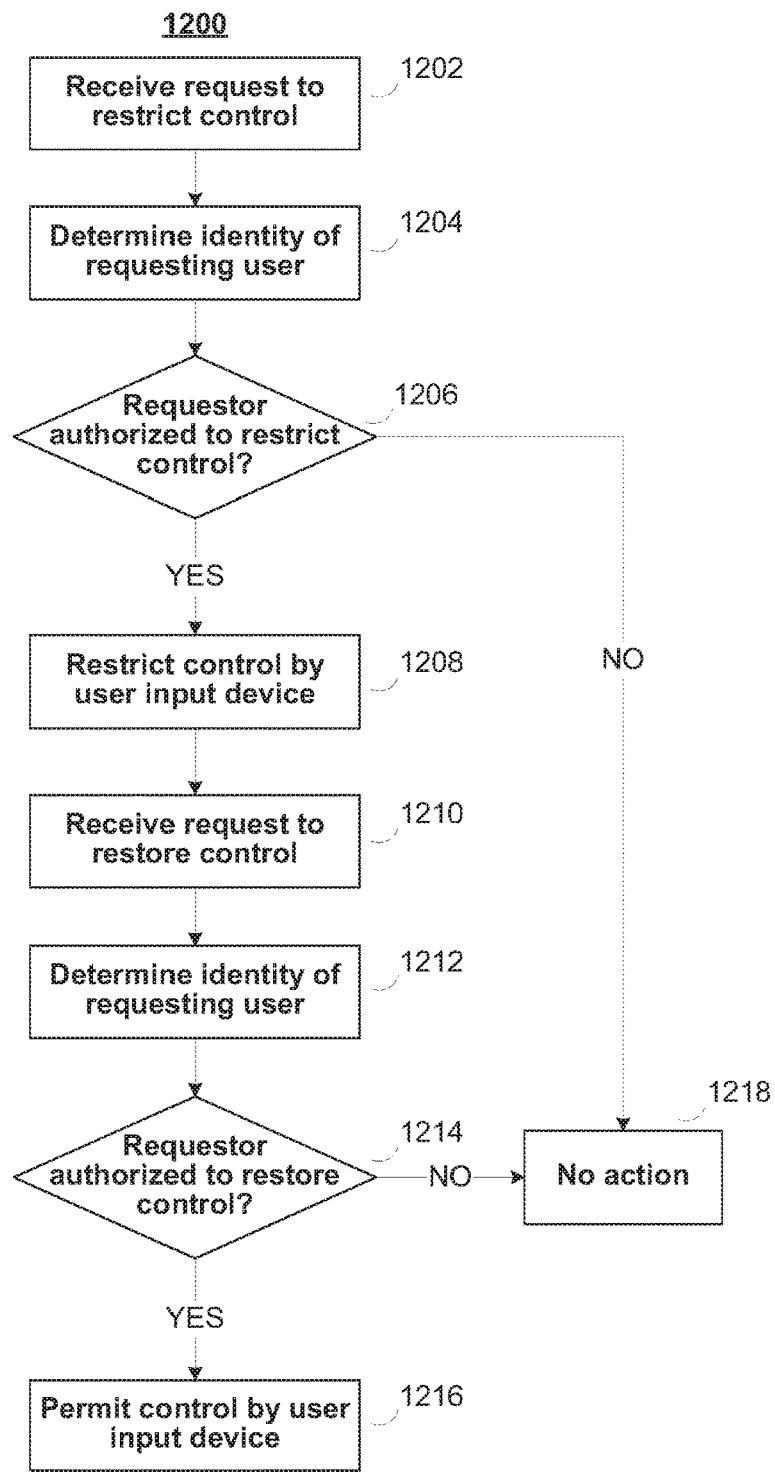
FIG. 12 is a flowchart of illustrative steps for restricting control by a user input device based on the identity of a user, in accordance with some embodiments of the disclosure.

FIG. 12 is a flowchart of illustrative steps for restricting control by a user input device based on the identity of a user, in accordance with some embodiments of the disclosure. In this process, one or more users are permitted to restrict control over the user equipment.

At step 1202, the user equipment receives a request to restrict control. This request is received at control circuitry 704, which stores or accesses rules that specify which user(s) are authorized to restrict control. These rules may be set by a user, such as a user with administrative privileges, and they may be changed by that user and modified on the user equipment. For example, a parent may say a verbal command to restrict control over the user equipment, so that a child cannot control the user equipment.

At step 1204, control circuitry 704 determines the identity of the user requesting to restrict control. The control circuitry 704 may determine the identity of this user by in any number of ways. For example, control circuitry 704 may receive data identifying a device used by the requestor that associated the device with a particular user. The data may include login information, device information, or any other information for identifying a particular user and/or device. As another example, control circuitry 704 can use voice, facial, or fingerprint recognition to identify the requestor.

At step 1206, control circuitry 704 determines whether the identified requestor has been authorized to restrict control over the user equipment. Control circuitry compares the identity of the user determined at step 1204 to the rules that have been previously stored on the user equipment. For example, control circuitry 704 may compare the parent's identity to rules that the parent had previously stored, to determine whether the parent is authorized to restrict control.

If the requestor is authorized to restrict control, then at step 1208, control circuitry 704 restricts control by the user input device. Step 1208 may be performed in any of the manners described with respect to FIGS. 10 and 11. For example, since the parent is authorized to restrict control, control circuitry 704 may set a rule that a child may not exert control over the user equipment. If the child then attempts to make commands, e.g., if the child attempts to change the channel, this command will be restricted.

If the requestor is not authorized to restrict control, then at step 1218, no action is taken. Control over the user equipment is not restricted. For example, if instead of the parent, a child had requested to restrict control, the user equipment may not respond to this request, as the child is not permitted to restrict control over the user equipment.

At step 1210, control circuitry 704 receives a request to restore control over the user equipment. For example, a parent may say a verbal command to restore control over the user equipment, so that a child would be permitted to control the user equipment. The command used to restore control over the user equipment need not be in the same format as the command used to restrict control. For example, the restrict command may be a verbal command, and the restore command may be issued through a user interface on a user input device, or vice versa.

At step 1212, control circuitry 704 determines the identity of the user requesting to restore control. This step may be carried out using any of the techniques described with respect to step 1204.

At step 1214, control circuitry 704 determines whether the identified requestor has been authorized to restore control over the user equipment. Control circuitry compares the identity of the user determined at step 1204 to a set of rules that has been previously stored on the user equipment. The rules may be the same set of rules that was used in step 1206 (i.e., the rules specifying who may restrict control), or there may be a different set of rules for restoring control.

If the requestor is authorized to restore control, then at step 1216 control circuitry 704 restores control by the user input device. This may be performed by reversing the restriction applied at step 1208, and may be performed in any of the manners described with respect to FIGS. 9-11.

If the requestor is not authorized to restore control, then at step 1218 no action is taken. Control over the user equipment is still restricted. For example, if instead of the parent, a child had requested to restore control, the user equipment may not respond to this request, and the child would still be prevented from controlling the user equipment.

Figure 13:
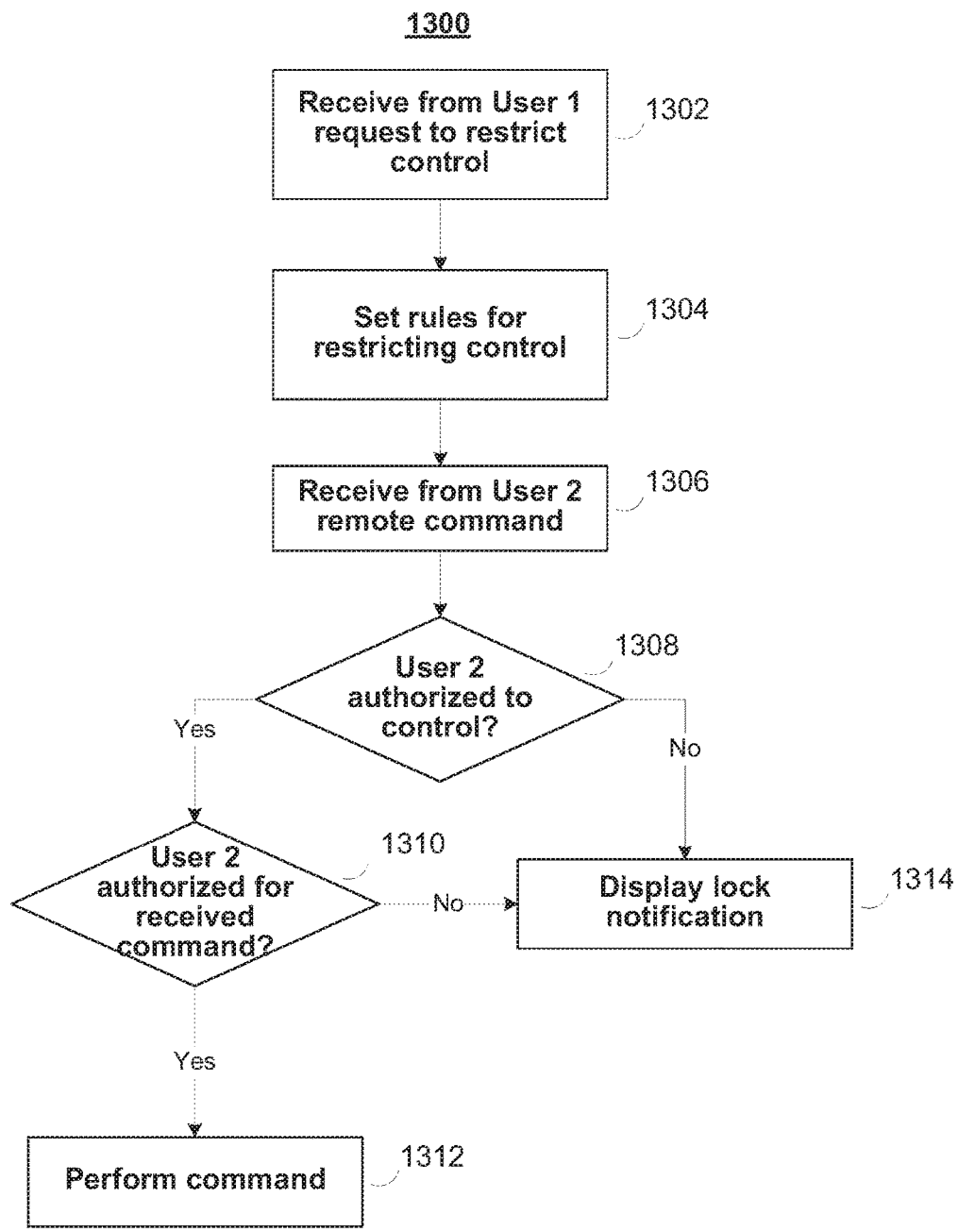
FIG. 13 is a flowchart of illustrative steps for restricting partial control by a user input device and alerting a user, in accordance with some embodiments of the disclosure.

FIG. 13 is a flowchart of illustrative steps for restricting control by a user input device and alerting a user that control is restricted, in accordance with some embodiments of the disclosure.

At step 1302, user equipment receives a request to restrict control from User 1. This request is received at control circuitry 704. Control circuitry 704 may determine the identity of the requesting user and decide whether to respond to the request to restrict control based on the user's identity, as described with respect to FIG. 12.

At step 1304, control circuitry 704 stores or accesses rules that specify the control restrictions requested by User 1. These rules may specify, for example, which users are restricted, which types of commands are restricted, and/or which devices are restricted from controlling the user equipment. The rules may be set in a number of ways. For example, a set of default rules may have already been set by a user, such as a user with administrative privileges, and these rules are accessed when the request is received at step 1302. The administrative user, or User 1, may be permitted to change these rules. Alternatively, User 1 may specify rules along with the request from step 1302. For example, User 1 may say aloud "Prevent Boris from changing the channel." Or User 1 may use an on-screen interface such as the interface shown in FIG. 4 to input rules, which are transmitted to control circuitry 704.

At step 1306, control circuitry 704 receives a remote command from User 2. The command may include data specifying the type of command (e.g., which button User 2 pressed, or which on-screen action User 2 selected), the identity of the user, and/or the identity of the device. For example, control circuitry 704 may receive a channel change command from Boris's smart phone.

At step 1308, control circuitry 704 determines whether User 2 is authorized to control the user equipment. To accomplish this, control circuitry 704 compares the command data describing the user and/or user input device that was received at step 1306 to the rules set at step 1304.

If User 2 is not authorized to control the user equipment, control circuitry 704 does not perform the command, and may display a lock notification, such as notification 304 shown in FIG. 3, at step 1304. Alternatively, control circuitry 704 may simply take no action.

If User 2 is authorized to control the user equipment, then at step 1310, control circuitry 704 determines whether User 2 is authorized for the specific command received. For example, User 2 may be permitted to change the volume, but may not be permitted to change which media is displayed (e.g., by changing a channel or selecting a different program) or to make any purchases. To determine whether User 2 is authorized for the specific command received, control circuitry 704 compares the command data describing the type of command received at step 1306 to the rules set at step 1304. For example, if Boris has only been restricted from changing the channel, Boris's channel change command is compared to the rules to determine that Boris is not authorized for the specific command he has requested.

If User 2 is not authorized for the specific command received, control circuitry 704 does not perform the command, and may display a lock notification, such as notification 304 shown in FIG. 3, at step 1304. Alternatively, control circuitry 704 may simply take no action.

If User 2 is authorized to control the user equipment, then at step 1312, control circuitry 704 performs the requested command. For example, had Boris requested to change the volume, control circuitry 704 would change the volume as requested.

It is contemplated that the steps or descriptions of FIGS. 9-13 may be used with any other embodiment of this disclosure. In addition, the descriptions described in relation to the algorithms of FIGS. 9-13 may be done in alternative orders or in parallel to further the purposes of this disclosure. For example, conditional statements and logical evaluations may be performed in any order or in parallel or simultaneously to reduce lag or increase the speed of the system or method. As a further example, in some embodiments, several instances of a variable may be evaluated in parallel, using multiple logical processor threads, or the algorithm may be enhanced by incorporating branch prediction. Furthermore, it should be noted that the processes of FIGS. 9-13 may be implemented on a combination of appropriately configured software and hardware, and that any of the devices or equipment discussed in relation to FIGS. 7-8 could be used to implement one or more portions of the process.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for preventing a user input device from controlling user equipment, the method comprising:
receiving, over a first communication path, by the user equipment, data indicative of a first request to restrict control by the user input device over the user equipment;
in response to receiving the first request, disregarding, by the user equipment, a first command that alters a first setting of the user equipment, wherein the first command is received from the user input device;
subsequent to receiving the first request, receiving, over the first communication path, by the user equipment, data indicative of a second request to restore control by the user input device over the user equipment;
receiving, by the user equipment, a second command that alters a second setting of the user equipment, wherein the second command is received from the user input device; and
in response to receiving the second request and the second command, altering, by the user equipment, the second setting of the user equipment.

2. The method of claim 1, wherein the first request comprises one or more verbal commands received from a user.

3. The method of claim 1, wherein the first communication path comprises a local area network, and the first request and the second request are received from a network connected user device.

4. The method of claim 1, further comprising:
in response to receiving the first request, deactivating a receiver circuitry coupled to the user equipment, the receiver circuitry being usable to receive commands from the user input device over a second communications path.

5. The method of claim 4, wherein the receiver circuitry comprises at least one of an infrared sensor, a radio frequency sensor, and circuitry for operating a sensor.

6. The method of claim 1, wherein the disregarding a first command from the user input device comprises:
determining an identity of a first user, wherein the first request comprises input received from the first user;
determining, based on the identity of the first user, that the first user is authorized to restrict control; and
disregarding the first command from the user input device in response to determining that the first user is authorized to restrict control.

7. The method of claim 6, wherein the determining the identity of the first user comprises at least one of applying voice pattern recognition to a verbal input received from the first user and applying facial recognition techniques to an image of the first user.

8. The method of claim 6, further comprising:
determining an identity of a second user, wherein the second request comprises input received from the second user, the second user being different from the first user; and
determining, based on the identity of the second user, that the second user is authorized to restore control.

9. The method of claim 1, further comprising:
based on receiving the first request, generating for display, on a display coupled to user equipment, a visual indicator that the user input device has been prevented from controlling the user equipment.

10. The method of claim 1, further comprising:
storing a rule at the user equipment identifying one or more properties of a user command to be disregarded;
comparing the first command from the user input device to the rule; and
disregarding the first command from the user input device if a property of the first command matches a property of the rule.

11. A system for preventing a user input device from controlling user equipment, the system comprising:
communications circuitry configured to:
receive, over a first communication path, data indicative of a first request to restrict control by the user input device over the user equipment; and
subsequent to receiving the first request, receive, over the first communication path, data indicative of a second request to restore control by the user input device over the user equipment; and
control circuitry configured to:
in response to receiving the first request, disregard a first command that alters a first setting of the user equipment, wherein the first command is received from the user input device; and
in response to receiving the second request and a second command that alters a second setting of the user equipment, alter the second setting of the user equipment, wherein the second command is received from the user input device.

12. The system of claim 11, wherein the first request comprises one or more verbal commands received from a user.

13. The system of claim 11, wherein the first communication path comprises a local area network, and the first request and the second request are received from a network connected user device.

14. The system of claim 11, wherein the control circuitry is further configured to:
in response to receiving the first request, deactivate a receiver circuitry coupled to the user equipment, the receiver circuitry being usable to receive commands from the user input device over a second communications path.

15. The system of claim 14, wherein the receiver circuitry comprises at least one of an infrared sensor, a radio frequency sensor, and circuitry for operating a sensor.

16. The system of claim 11, wherein the control circuitry is further configured to:
determine an identity of a first user, wherein the first request comprises input received from the first user;
determine, based on the identity of the first user, that the first user is authorized to restrict control; and
disregard the first command from the user input device in response to determining that the first user is authorized to restrict control.

17. The system of claim 16, wherein the determining the identity of the first user comprises at least one of applying voice pattern recognition to a verbal input received from the first user and applying facial recognition techniques to an image of the first user.

18. The system of claim 16, the control circuitry is further configured to:
determine an identity of a second user, wherein the second request comprises input received from the second user, the second user being different from the first user; and
determine, based on the identity of the second user, that the second user is authorized to restore control.

19. The system of claim 11, wherein the control circuitry is further configured to:
generate for display, on a display coupled to user equipment, a visual indicator that the user input device has been prevented from controlling the user equipment.

20. The system of claim 11, wherein the control circuitry is further configured to:
store a rule identifying one or more properties of a user command to be disregarded;
compare the first command from the user input device to the rule; and
disregard the first command from the user input device if a property of the first command matches a property of the rule.

* * * * *